United States Patent [19]

Ikeda et al.

[11] Patent Number: 5,744,178
[45] Date of Patent: Apr. 28, 1998

[54] RUMINANT FEED ADDITIVE COMPOSITION CONTAINING NOVEL PHOSPHORIC ACID-AMINO ACID-POLYVALENT METAL COMPOSITE SALT AND GASTRIC ANTACID

[75] Inventors: Toru Ikeda; Toshihide Yukawa; Hisamine Kobayashi; Hiroyuki Sato; Nobuyoshi Kitamura, all of Kawasaki, Japan

[73] Assignee: Ajinomoto Co., Inc., Tokyo, Japan

[21] Appl. No.: 774,362

[22] Filed: Dec. 27, 1996

[30] Foreign Application Priority Data

Dec. 27, 1995 [JP] Japan ................... 7-341250

[51] Int. Cl.⁶ ........................................ A23K 1/175
[52] U.S. Cl. ........................ 426/2; 426/74; 424/438
[58] Field of Search ................ 426/2, 74; 424/438

[56] References Cited

U.S. PATENT DOCUMENTS

| | | | |
|---|---|---|---|
| 3,551,162 | 12/1970 | Gilbert | 426/74 |
| 3,794,740 | 2/1974 | Achorn | 426/74 |
| 4,234,608 | 11/1980 | Linehan | 426/74 |
| 4,265,916 | 5/1981 | Skoch | 426/74 |
| 4,729,896 | 3/1988 | Sawhill | 426/2 |
| 4,851,242 | 7/1989 | Dubois | 426/74 |
| 4,851,244 | 7/1989 | Theunick | 426/74 |
| 4,888,185 | 12/1989 | Miller | 426/74 |
| 4,900,561 | 2/1990 | Abdel Monem | 426/2 |
| 4,931,292 | 6/1990 | Torstensson | 426/2 |
| 4,937,082 | 6/1990 | Sawhill | 426/74 |
| 4,937,083 | 6/1990 | Itagaki | 426/74 |
| 4,948,594 | 8/1990 | Abdel Monem | 426/2 |
| 4,963,371 | 10/1990 | Miller | 426/74 |
| 4,994,284 | 2/1991 | Miller | 426/74 |
| 5,140,949 | 8/1992 | Chu | 426/2 |
| 5,147,664 | 9/1992 | Gillonnier | 426/2 |
| 5,227,166 | 7/1993 | Ueda | 426/74 |
| 5,264,227 | 11/1993 | Laroche | 426/74 |
| 5,300,294 | 4/1994 | Ueda | 426/74 |
| 5,622,739 | 4/1997 | Benton | 426/74 |

FOREIGN PATENT DOCUMENTS 363098357A 4/1988 Japan.

OTHER PUBLICATIONS

Morrison 1956 Feed and Feeding, A Handbook for the Student and Stockman 22ed. Morrison Publishing Co. Ithaca, NY pp. 88–102, 114, 115.

Feldmann 1990 Handbook of Nonprescription Drugs 9th ed. American Pharmaceutical Assoc. pp. 255–262.

Anon. 1942 Keeping Livestock Healthy USDA 77th Congress 2nd Session. House Documen 527 pp. 648–651.

Swenson 1933 Dukes Physiology of Domestic Animals 9th ed. Comstock Publishing Assoc. Ithaca, NY pp. 256–260, 287, 395–397.

*Primary Examiner*—Carolyn Paden
*Attorney, Agent, or Firm*—Oblon, Spivak, McClelland, Maier & Neustadt, P.C.

[57] ABSTRACT

A ruminant feed additive composition in the form of a powder or granules comprises as active ingredients a gastric antacid, a phosphoric acid-amino acid-polyvalent metal composite salt and optionally a water-insoluble salt of a polyvalent metal-sensitive water-soluble high-molecular weight substance. The phosphoric acid-amino acid-polyvalent metal composite salt is composed of a phosphoric acid such as orthophosphoric acid, a polyphosphoric acid or a metaphosphoric acid, a basic amino acid such as lysine or methionine, an alkaline earth metal such as calcium or magnesium and, optionally, a polyvalent metal such as aluminum.

21 Claims, No Drawings

RUMINANT FEED ADDITIVE COMPOSITION CONTAINING NOVEL PHOSPHORIC ACID-AMINO ACID-POLYVALENT METAL COMPOSITE SALT AND GASTRIC ANTACID

BACKGROUND OF THE INVENTION

1. Field of the Invention

The present invention relates to a ruminant feed additive composition and a method of administering a feed additive composition to a ruminant. More specifically, the present invention relates to a powdery or uniform granular ruminant feed additive composition which is stable in the rumen of a ruminant and which can release basic amino acids in the abomasum and lower digestive organs, and a method of administering this feed additive composition to a ruminant.

2. Description of the Background

When biologically active substances, such as amino acids or vitamins are orally administered directly into ruminants, such as cows and sheep, these substances are typically decomposed by microorganisms in the rumen, and are therefore, not effectively utilized. Rumen by-pass preparations which protect these biologically active substances from decomposition by microorganisms in the rumen, but allow them to be digested and absorbed in the abomasum and lower digestive organs, are important in the field of ruminant feed, nutrients and chemicals.

With respect to ruminant feed additives, a method in which a biologically active substance is dispersed in a matrix formed of a hydrophobic substance, such as fats and oils, or a protective substance, such as a basic high-molecular weight substance, and the dispersion is granulated; or a method in which a core containing a biologically active substance is coated with a hydrophobic substance, such as fats and oil, or an acid-sensitive substance, such as a basic high-molecular weight substance, have been proposed.

A method in which the biologically active substance is dispersed in the protective substance includes, for example, Japanese Laid-open Patent Application (Kokai) [hereinafter referred to as "Japanese Kokai"] No. 168,351/1985 which proposes a method which comprises mixing a biologically active substance with at least 20% by weight of calcium carbonate and at least 10% by weight of an aliphatic monocarboxylic acid having 14 or more carbon atoms, hardened fats and oils or the like, and pulverizing the mixture. Another example, Japanese Patent Publication No. 10,780/1984, proposes a method which comprises dispersing from 30 to 50% by weight of a biologically active substance in a protective substance comprising from 10 to 35% by weight of a salt of an aliphatic monocarboxylic acid having from 14 to 22 carbon atoms or ricinoleic acid, and the remainder an aliphatic monocarboxylic acid having from 14 to 22 carbon atoms, ricinoleic acid or hardened fats and oils.

A method in which the biologically active substance is coated with the hydrophobic protective substance includes, for example, Japanese Kokai No. 317,053/1988, which proposes a method in which a biologically active substance is coated with a protective agent composed of an aliphatic monocarboxylic acid having from 12 to 24 carbon atoms, hardened fats and oils, lecithin and a glycerin fatty acid ester.

A method in which the biologically active substance is coated with the acid-sensitive protective substance includes, for example, Japanese Kokai No. 46,823/1979, which proposes a method in which a biologically active substance is coated with a coating composition containing a film-forming basic high-molecular weight substance. Another example, Japanese Kokai No. 217,625/1992, proposes a method in which a biologically active substance is spray-coated with casein in the form of an aqueous emulsion or an aqueous dispersion.

However, in the method in which the biologically active substance is dispersed into the protective substance, the biologically active substance is present near the surface of the particles. Accordingly, for the protective substance to be effective, the content of the biologically active substance has to be notably decreased. Since the residence time of the water-soluble biologically active substance in the rumen is between approximately 10 hours and several days, the biologically active substance is insufficiently protected.

Further, the method in which the biologically active substance-containing core is coated with the acid-sensitive high-molecular weight substance or the hydrophobic protective substance has also been proposed. However, mechanical granulation and/or coating destruction occurs when this composition is mixed or pulverized with another feed compositions and stability in the rumen of a ruminant is impaired in many cases. Thus, the composition is not considered a multi-purpose feed additive.

Preferably, a feed additive can withstand mixing or pulverization with another feed composition, and itself is in the form of a powder or uniform granules and prevent release of the biologically active substance in the rumen, and allows elution of the biologically active substance in the abomasum and lower digestive organs. However, when a basic amino acid is used to improve nutrition of the feed, the phosphorus wolframate of the basic amino-acid is the only substance which contains the basic amino-acid, which takes the form of a powder or uniform granules, and which is insoluble in a neutral solution and is acid-soluble.

Japanese Kokai No. 98,357/1988 discloses a ruminant feed additive composition in which a salt of a basic amino acid and an acidic phosphate is coated. The salt of the acidic phosphoric acid alkaline-earth-metal salt and the basic amino acid of this document corresponds to an analogue of the phosphoric acid-amino acid composite salt of the present invention. However, in the salt of the acidic phosphoric acid alkaline-earth-metal salt and the basic amino acid, the molar ratio of phosphoric acid, alkaline-earth metal and basic amino acid is 1:0.5:1 to 2, which is different from that of the composite salt of phosphoric acid, alkaline-earth metal and basic amino acid of the present invention. The salt of the acidic phosphoric acid alkaline-earth-metal salt and the basic amino acid of the present invention is decomposed in water over the course of time to form an alkaline-earth-metal secondary phosphate, a basic amino-acid primary phosphate or a basic amino-acid secondary phosphate. Since the basic amino-acid phosphate exhibits high water-solubility, this salt is substantially neutral and water-soluble; compared to the solubility of the basic amino acid.

Phosphoric acid forms various salts with alkaline-earth metals, and some of which are insoluble in neutral or alkaline aqueous solutions and are soluble in acidic aqueous solutions. For example, it is known that calcium secondary phosphate, magnesium tertiary phosphate and the like accumulate as scale in equipment for fermentation in industrial plants in which phosphoric acid is often used, causing trouble with the equipment. Ammonium magnesium phosphate shows similar behavior. Only in a prior application (Japanese Patent Application No. 306,385/1994) of the present inventors are disclosed a composite salt comprising 1 mol of phosphoric acid; 1 mol of an alkaline-earth metal and 1 mol of a basic amino acid in which an ammonium ion is replaced with an equivalent basic amino acid as a basic ion; an alkaline-earth-metal salt of a tertiary phosphoric acid salt and/or a secondary phosphoric acid salt comprising 1 mol of phosphoric acid, from 1 to 1.45 mols of an alkaline-earth metal and from 1 to 0.05 mols of a basic amino acid; and a phosphoric acid-amino acid composite salt which is an alkaline-earth-metal salt of condensed phosphoric acid or metaphosphoric acid in which the equivalent ratio of the basic amino acid to the alkaline-earth metal is 0.02 to 0.3:0.7 to 0.98.

SUMMARY OF THE INVENTION

An object of the present invention is to provide, in consideration of safety and economics, a composition which contains a basic amino acid which is not dissolved in the rumen of a ruminant, but allows elution of the basic amino acid in the abomasum and lower digestive organs, digestion and absorption with high efficiency, as well as a method of forming a composition into powder or granules, and a method of effectively administering the composition to a ruminant.

The present inventors have conducted investigations to achieve the above object, and have found that a composite salt comprising a basic amino acid, an alkaline-earth metal and phosphoric acid is insoluble in neutral or alkaline aqueous solution and soluble in acidic aqueous solution, and is in granular form, that a composite salt (hereinafter referred to as "a polyvalent-metal-treated composite salt") obtained by treating a composite salt comprising the basic amino acid, magnesium and orthophosphoric acid (hereinafter referred to as "an intermediate starting composite salt") with another divalent or trivalent (polyvalent) metal exhibits better stability to neutral or slightly acidic aqueous solution, and that the presence of the polyvalent-metal-treated composite salt and a water-insoluble salt of a polyvalent-metal-sensitive water-soluble high-molecular weight substance can further improve the stability to neutral or slightly acidic aqueous solution. Moreover, it has been found that when orally administering the intermediate starting composite salt, the polyvalent-metal-treated composite salt and/or the composition of the polyvalent-metal-treated composite salt and the water-insoluble salt of the polyvalent-metal-sensitive water-soluble high-molecular weight substance to a ruminant, the presence of a gastric antacid in the composite salts and/or the composition, causes the composite salts and/or the composition to exhibit excellent insolubility in the rumen of the ruminant, and elution in the abomasum and lower digestive organs. These findings have led to the completion of the present invention.

The present invention is a ruminant feed additive, comprising a gastric antacid, and a phosphoric acid-amino acid-polyvalent metal composite salt, wherein the phosphoric acid-amino acid-polyvalent metal composite salt comprises an alkaline-earth metal and a phosphate moiety of a phosphoric acid selected from the group consisting of orthophosphoric acid, polyphosphoric acids and metaphosphoric acids. The phosphoric acid-amino acid-polyvalent metal composite salt is less soluble in neutral or alkaline aqueous solution than in acidic aqueous solution. The phosphate moiety of a phosphoric acid is a phosphoric acid molecule, without the hydrogen atoms.

The present invention also provides a ruminant feed additive composition containing a phosphoric acid-amino acid composite salt of a basic amino acid, an alkaline-earth metal and orthophosphoric acid, represented by formula (1)

$$R_aM_bH_cPO_4 \cdot nH_2O \tag{1}$$

wherein

R represents a basic amino-acid hydrogen cation,

M represents an alkaline-earth metal, a is 0.05 to 1, b is 1 to 1.47, c is 0 to 0.3, a+(2×b)+c=3, and n is 0 to 10 and/or a phosphoric acid-amino acid composite salt of a basic amino acid, an alkaline-earth metal and polyphosphoric acid, represented by formula (2)

$$R_aM_bH_cPO_4(PO_3) \cdot nH_2O \tag{2}$$

wherein

R represents a basic amino-acid hydrogen cation,

M represents an alkaline-earth metal, a is 0.02×(m+3) to 0.3×(m+3), b is 0.35×(m+3) to 0.49×(m+3), c is 0 to 0.2×(m+3), a+(2×b)+c=m+3, m is 1 to 20, and n is 0 to 10 and/or a phosphoric acid-amino acid composite salt of a basic amino acid, an alkaline-earth metal and metaphosphoric acid, represented by formula (3)

$$R_aM_bH_c(PO_3)_m \cdot nH_2O \tag{3}$$

wherein

R represents a basic amino-acid hydrogen cation,

M represents an alkaline-earth metal, a is 0.02×m to 0.3×m, b is 0.35×m to 0.49×m, c is 0 to 0.2×m, a+(2×b)+c=m, m is 3 to 50,and n is 0 to 20 and/or a phosphoric acid-amino acid composite salt of a basic amino acid, magnesium, a polyvalent metal other than magnesium and orthophosphoric acid, represented by formula (4)

$$R_aMg_bM_cH_dPO_4 \cdot nH_2O \tag{4}$$

wherein

R represents a basic amino-acid hydrogen cation,

M represents a polyvalent metal of m-valence other than magnesium, m is 2 or 3, a is 0.05 to 1.0, b is 0.85 to 1.43, c is 0.02 to 0.6, d is 0 to 0.3, a+(b×2)+(c×m)+d=3, and n is 0 to 20 and/or the phosphoric acid-amino acid composite salt of formula (4) and a water-insoluble salt of a polyvalent-metal-sensitive water-soluble high-molecular weight substance as main components; a powdery or granular ruminant feed additive composition comprising the composite salt and/or the composition and a gastric antacid which is used to make the composite salt and/or the composition insoluble in the rumen of a ruminant when orally administering the composite salt and/or the composition to the ruminant, but allows elution of the same in the abomasum and lower digestive organs thereof; and a method of administering the feed additive composition into a ruminant, wherein the gastric antacid is orally administered previously or simultaneously.

The term basic amino-acid hydrogen cation means a moiety with the structure of the cation formed by the basic amino acid when reacted with a Bronsted acid. In the context of formulas (1)–(4), the charge on the cation is ignored.

DETAILED DESCRIPTION OF THE INVENTION

In the present invention, examples of phosphoric acid include orthophosphoric acid; polyphosphoric acids such as diphosphoric acid (pyrophosphoric acid); polyphosphoric acids such as tripolyphosphoric acid, tetrapolyphosphoric acid and the like; metaphosphoric acids such as trimetaphosphoric acid, tetrametaphosphoric acid, hexametaphosphoric acid and the like; and concentrated phosphoric acid. Salts of orthophosphoric acid, diphosphoric acid, tripolyphosphoric acid, tetrapolyphosphoric acid, trimetaphosphoric acid and hexametaphosphoric acid and other metaphosphoric acids are preferable in view of solubility.

In the present invention, the basic amino acid includes natural basic amino acids such as lysine, arginine and ornithine; basic derivatives thereof; and basic derivatives of neutral amino acids. These amino acids are used either singly or in combination. Specific examples include natural basic amino acids such as lysine, arginine and ornithine; amides and esters of amino acids such as methionine, tryptophane and threonine; and basic derivatives such as basic amino-acid containing peptides.

In the present invention, examples of the alkaline-earth metals include magnesium, calcium, strontium and barium. Salts of magnesium and calcium are preferable because these are biologically safe.

The phosphoric acid-amino acid composite salt of the present invention is a composite salt which is obtained as a crystalline precipitate when the basic amino acid, the alkaline-earth metal and the phosphoric acid are present in an aqueous solution in a neutral or alkaline condition in which the basic amino acid is used at a relatively high concentration. The phosphoric acid-amino acid composite salt is roughly grouped into 4 types depending on the presence or absence of condensation of phosphoric acid, the mode of condensation, and the equivalent ratio of the basic amino acid and the alkaline-earth metal in the case of orthophosphoric acid. The present invention also includes a composite salt of a fifth type wherein the phosphoric acid-amino acid composite salt in which the phosphoric acid is orthophosphoric acid and the alkaline-earth metal is magnesium, is treated with the divalent or trivalent (polyvalent) metal other than magnesium to contain the polyvalent metal, and a composition comprising the polyvalent-metal-treated composite salt of the fifth type and a water-insoluble salt of a polyvalent-metal-sensitive water-soluble high-molecular weight substance.

In the present invention, the composite salt of the first type constituting the feed additive composition is an amino-acid composite salt of formula (1) in which the amount of orthophosphoric acid is 3 equivalents, that of the basic amino-acid hydrogen cation (a) is 1 equivalent, that of the alkaline-earth metal (b) is 2 equivalents and that of the acid residue (c) is 0, n is 0, 1 or 2. However, n may be 0 to 10, depending on drying conditions. The composite salt of the second type is a phosphoric acid-amino acid composite salt of formula (1) in which the amount of orthophosphoric acid is 3.0 equivalents, that of the basic amino-acid hydrogen cation (a) is 0.05 to 1.0 equivalent, that of the alkaline-earth metal (b) is 2.0 to 2.94 equivalents, that of the acid residue (c) is 0 to 0.3, (a)+2×(b)+(c)=3, and n is 0 to 10. Preferably, the salt is a phosphoric acid-amino acid composite salt in which the amount of orthophosphoric acid is 3.0 equivalents, that of the basic amino-acid hydrogen cation (a) is 0.05 to 0.8 equivalents, and that of the alkaline-earth metal (b) is 2.2 to 2.94 equivalents. In the composite salts of the first and second types, magnesium and calcium are preferable as an alkaline-earth metal salt. A salt of magnesium alone and a mixed salt of magnesium and calcium are more preferable.

The composite salt of the third type is a phosphoric acid-amino-acid composite salt of formula (2) in which the amount of polyphosphoric acid is 100 equivalents, that of the basic amino-acid hydrogen cation (a) is 2 to 30 equivalents, that of the alkaline-earth metal (b) is 70 to 98 equivalents, that of the acid residue (c is 0 to 20 equivalents, (a)+2×(b)+(c)=100, and n is 0 to 10. The composite salt of the fourth type is a composite salt of formula (3) in which the amount of metaphosphoric acid is 100 equivalents, that of the basic amino-acid hydrogen cation (a) is 2 to 30 equivalents, that of the alkaline-earth metal (b) is 70 to 98 equivalents, that of the acid residue (c) is 0 to 20 equivalents, (a)+2×(b)+(c)=100, and n is 0 and 20. In the composite salts of the third and fourth types, magnesium and calcium are preferably used as the alkaline-earth metal. A salt of calcium alone and a mixed salt of magnesium and calcium are more preferable.

The composite salt of the fifth type is a phosphoric acid-amino acid composite salt of formula (4) containing the phosphoric acid-amino acid composite salt of formula (1) in which the alkaline-earth metal is magnesium, and a divalent or trivalent (polyvalent) metal other than magnesium. That is, it is a composite salt in which a part of the mixture of a basic amino acid, magnesium and an acid residue is replaced with a polyvalent metal other than magnesium, and which is obtained by using a phosphoric acid-amino acid composite salt of orthophosphoric acid, a basic amino acid and magnesium as an intermediate starting composite salt, and treating the intermediate starting composite salt with a polyvalent metal other than magnesium. Specifically, it is a salt corresponding to a salt containing a tertiary phosphate of orthophosphoric acid and/or the tertiary phosphate as a main component and a secondary phosphate in which the amount of phosphoric acid is 3 equivalents, that of the basic amino acid (a) is 0.05 to 1, that of magnesium (b) is 1.7 to 2.86, that of a divalent or trivalent [polyvalent (m)] metal (c) other than magnesium is 0.02 to 0.6 equivalents, that of the acid residue (d) is 0 to 0.3 equivalents, (a)+(b)×2+(c)×(m)+(d)=3, a molar ratio of a secondary phosphate is ½ or less of that of a tertiary phosphate, and a water content in the composite salt is 30% by weight or less.

Examples of the divalent or trivalent (polyvalent) metal other than magnesium, constituting the phosphoric acid-amino acid composite salt of the fifth type, include alkaline-earth metals such as calcium, strontium and barium; transition metals such as aluminum, iron, cobalt, manganese and chromium; and divalent metals such as zinc and cadmium. Calcium, aluminum, iron and zinc salts are preferably used, since these metals are biologically safe.

The composition comprising the polyvalent-metal-treated composite salt of the fifth type and the water-insoluble salt of the polyvalent-metal-sensitive water-soluble high-molecular weight substance is obtained by mixing the composite salt of the fifth type and the polyvalent-metal-sensitive water-soluble high-molecular weight substance in water. With respect to the polyvalent-metal-sensitive water-soluble high-molecular weight substance of the present invention, the term "polyvalent-metal-sensitive" means that the water-soluble high-molecular weight substance or its water-soluble salt is mixed with the polyvalent-metal-containing aqueous solution to form a salt which has a markedly increased viscosity, which gels, or which is insoluble in water.

The water-insoluble salt of the polyvalent-metal-sensitive water-soluble high-molecular weight substance which forms the ruminant feed additive composition in combination with the phosphoric acid-amino acid composite salt of the present invention is not particularly limited so long as it is highly viscous, gels or is insoluble in water, when reacted with the polyvalent metal. This salt includes water-insoluble salts of polysaccharides having a carboxyl group, synthetic high-molecular weight substances and proteins. Examples of the polysaccharides having a carboxyl group include alginic acid, dieran gum, pectin, carboxymethyl cellulose and carboxymethyl starch. Examples of the high-molecular weight substances include polyacrylic acid and/or a copolymer of polyacrylic acid, and polymethacrylic acid and/or a copolymer of polymethacrylic acid. Examples of the proteins include soybean protein and casein. As the polyvalent metal salt, a calcium salt, an aluminum salt, a zinc salt and an iron salt, are especially preferable.

A process for producing the phosphoric acid-amino acid composite salt of the first or second type is not particularly limited so long as the salt is insoluble in a neutral or alkaline aqueous solution and is soluble in an acidic aqueous solution. Roughly, the following four processes are preferable.

In the first process, a secondary phosphate of an alkaline-earth metal is dispersed into a large amount of a basic aqueous solution of a basic amino acid, the dispersion is heated, and the precipitate obtained is washed. Specifically, a process is mentioned in which an alkaline-earth-metal secondary phosphate such as magnesium hydrogenphosphate or calcium hydrogenphosphate is added to a large amount of a basic concentrated aqueous solution of a basic amino acid formed through treatment with an ion exchange resin, and the mixture is heated and mixed while being stirred. The alkaline-earth-metal secondary phosphate in the mixed solution dissolves over time, and the phosphoric acid-amino acid composite salt is formed as a precipitate. When the precipitate is subjected to solid-liquid separation and excess basic amino acid on the precipitate is then washed away with water and dried, the phosphoric acid-amino acid composite salt composition containing the composite salt of the first type as a main component is obtained.

In the second process, an aqueous solution of an alkaline-earth metal and orthophosphoric acid are mixed at an equivalent ratio of 2.9 to 2.0:3.0 in a large amount of a basic aqueous solution of a basic amino acid, and the resulting precipitate is washed. Specifically, 3 equivalents or more of a basic concentrated aqueous solution of a basic amino acid is neutralized with 3 equivalents of orthophosphoric acid to form a concentrated tertiary phosphate solution. From 2.9 to 2.0 equivalents of a concentrated aqueous solution of a neutral salt of an alkaline-earth metal such as magnesium chloride or magnesium sulfate are added thereto, and the mixture is stirred. The resulting precipitate is subjected to solid-liquid separation, and excess basic amino acid on the precipitate is washed away with water and dried. In this process, the phosphoric acid-amino acid composite salt composition containing the composite salt of the first or second type as a main component is obtained depending on the addition rate and the type of the seed crystal in the addition. That is, when an alkaline-earth-metal neutral salt solution is gradually added in an amount of approximately 2 equivalents relative to 3 equivalents of orthophosphoric acid using the composite salt of the first type as a seed crystal, the phosphoric acid-amino acid composite salt containing the composite salt of the first type as a main component is obtained. In contrast, when the alkaline-earth-metal neutral salt solution is rapidly added in an amount of approximately 2.8 equivalents relative to 3.0 equivalents of orthophosphoric acid, the phosphoric acid-amino acid composite salt composition containing the composite salt of the second type as a main component is obtained.

In the third process, from 2.9 to 2.0 equivalents of an alkaline-earth-metal hydroxide is added to a solution obtained by mixing and neutralizing 1.0 equivalent of a basic aqueous solution of a basic amino acid with 3.0 equivalents of orthophosphoric acid, and the resulting precipitate is washed. Specifically, 1.0 equivalent of a basic concentrated aqueous solution of a basic amino acid is mixed and neutralized with 3.0 equivalents of orthophosphoric acid to form a concentrated aqueous solution of the basic amino acid primary phosphate, and from 2.9 to 2.0 equivalents of the alkaline-earth-metal hydroxide such as magnesium hydroxide or calcium hydroxide are added to this solution in the form of an aqueous dispersion. The alkaline-earth-metal hydroxide added dissolves over time, and the phosphoric acid-amino acid composite salt is formed as a precipitate. The precipitate is subjected to solid-liquid separation, and excess basic amino acid on the precipitate is then washed away with water, and dried to obtain a phosphoric acid-amino acid composite salt containing the composite salt of the secondary type as a main component.

In the fourth process, from 2.94 to 2.2 equivalents of an alkaline-earth-metal hydroxide is added to a solution obtained by mixing and neutralizing from 0.05 to 0.8 equivalents of a basic aqueous solution of a basic amino acid with 3.0 equivalents of orthophosphoric acid, and the mixture is then heat-dried. Specifically, from 0.05 to 0.8 equivalents of a basic concentrated aqueous solution of a basic amino acid are mixed and neutralized with 3.0 equivalents of orthophosphoric acid to form a mixed concentrated aqueous solution of a primary phosphate and orthophosphoric acid, and from 2.94 to 2.2 equivalents of an alkaline-earth-metal hydroxide such as magnesium hydroxide or calcium hydroxide are added to this solution in the form of an aqueous dispersion. The alkaline-earth-metal hydroxide added dissolves over time, and the phosphoric acid-amino acid composite salt is formed as a precipitate. When the precipitate is dried as is, the phosphoric acid-amino acid composite salt composition containing the composite salt of the second type as a main component is obtained.

In these four processes, the basic concentrated aqueous solution of the basic amino acid is adopted as a starting material, and the amino-acid composite salt is formed by a reaction in which the basic amino acid is used at a relatively high concentration. In the present invention, the concentration of the basic amino acid is preferably 10 to 60 parts by weight per 100 parts by weight of the total water content present in the reaction system, in the case of the second process in which the highest concentration is selected; and is preferably 3 to 20 parts by weight per 100 parts by weight of the total water content present in the reaction system, in the case of the fourth process in which the lowest concentration is selected.

These four processes may also be used in combination. Specific examples thereof include a process in which an appropriate amount of a concentrated aqueous solution of orthophosphoric acid and an alkaline-earth-metal neutral salt is added to a reaction solution in which the phosphoric acid-amino acid composite salt is formed as a precipitate in the first process, these are mixed while being stirred, and the mixture is heated, whereby the concentrated aqueous solution is reacted with the large amount of the basic amino acid remaining in the reaction solution; and a process in which an appropriate amount of an alkaline-earth-metal hydroxide is added to a reaction solution in which a phosphoric acid-amino acid composite salt is formed as a precipitate in the second process, whereby the alkaline-earth-metal hydroxide is reacted with the large amounts of the basic amino acid and phosphoric acid remaining in the reaction solution. The thus-obtained phosphoric acid-amino acid composite salt is a mixture of the composite salts of the first and second types, and the process and the reaction conditions influence the composition ratio thereof.

The third or fourth process for producing a phosphoric acid-amino acid composite salt in which phosphoric acid is polyphosphoric acid or metaphosphoric acid is not particularly limited so long as it is insoluble in a neutral or alkaline aqueous solution and is soluble in an acidic aqueous solution. It is approximately identical to the process for producing the composite salt of orthophosphoric acid except that the phosphoric acid is polyphosphoric acid or metaphosphoric acid. Roughly, the following three processes are preferable.

In the first process, from 70 to 130 equivalents, per 100 equivalents of the above-mentioned phosphoric acid, of a neutral aqueous solution of an alkaline-earth metal are added to a basic aqueous solution obtained by adding the above-mentioned phosphoric acid and/or an alkali-metal salt of the above-mentioned phosphoric acid to a large amount of a basic aqueous solution of a basic amino acid, and the resulting precipitate is washed and dried to obtain the composite salt.

In the second process, an acidic or neutral aqueous solution obtained by neutralizing a basic aqueous solution of from 2 to 50 equivalents, per 100 equivalents of the above-mentioned phosphoric acid, of a basic amino acid is mixed with from 70 to 130 equivalents of an alkaline-earth-metal hydroxide and/or oxide, and the resulting precipitate is washed and dried to obtain the composite salt.

In the third process, an acidic aqueous solution formed by neutralizing a basic aqueous solution containing from 2 to 30 equivalents, per 100 equivalents of the above-mentioned phosphoric acid, of a basic amino acid with 100 equivalents of the above-mentioned phosphoric acid is mixed with from 70 to 130 equivalents of an alkaline-earth-metal hydroxide and/or oxide, and the reaction product is dried as is to obtain the composite salt composition.

The composite salt of the third or fourth type of the present invention may be prepared separately. It is also preferable to prepare the composite salt mixed composition of the third and fourth types by mixing the starting polyphosphoric acid and metaphosphoric acid simultaneously or previously.

In addition to the process for preparing the composite salts of the first and second types or the composite salts of the third and fourth types separately in the present invention, there is also a process for preparing the composite salt mixed composition of the first to fourth types by mixing the starting phosphoric acids simultaneously or previously. Preferable are: (i) a process in which condensed phosphoric acid and/or metaphosphoric acid and an alkaline-earth metal are added to a reaction solution in which the composite salt compositions of the first and second types have been previously formed to prepare the composite salt of the third and/or fourth type; and (ii) a process in which orthophosphoric acid and an alkaline-earth metal are added to a reaction solution in which the composite salt compositions of the third and fourth types have been previously formed to prepare the composite salt mixed composition of the first to fourth types.

The fifth process for preparing the phosphoric acid-amino acid composite salt in the present invention is not particularly limited so long as it is insoluble in a neutral or alkaline aqueous solution and soluble in an acidic aqueous solution. Preferable is a process in which an intermediate starting composite salt is mixed with a solution of a divalent or trivalent (polyvalent) metal other than magnesium, and the mixture is separated and dried. The intermediate starting composite salt may be prepared by the process for producing the composite salt of the first or second type, provided that the alkaline-earth metal is limited to magnesium. The above-mentioned four processes are preferable.

In the present invention, the salt solution of the divalent or trivalent (polyvalent) metal other than magnesium which is used when treating the intermediate starting composite salt is not particularly limited. Preferable is a weakly acidic or basic aqueous solution or dispersion containing at least 0.001 parts by weight, per 100 parts by weight of solution, of the polyvalent metal ion other than magnesium. Specific examples include aqueous solutions of aluminum salts such as aluminum chloride, polyaluminum chloride, aluminum sulfate, ammonium alum and potassium alum; aqueous solutions or aqueous dispersions of calcium salts such as calcium chloride, calcium sulfate, calcium hydroxide and calcium nitrate; aqueous solutions of iron salts such as ferrous chloride, ferric chloride, ferrous sulfate, ferric sulfate, potassium iron sulfate and ammonium iron sulfate; and aqueous solutions or aqueous dispersions of zinc salts such as zinc chloride, ammonium zinc chloride and zinc hydroxide. These solutions of the polyvalent metals other than magnesium may be used either singly or in combination as a mixed salt solution or a composite salt solution.

The necessary amount of the divalent or trivalent (polyvalent) metal salt other than magnesium, which is used to obtain the polyvalent-metal-treated composite salt in the present invention, varies depending on the time of contact with the intermediate starting composite salt, the concentration of the divalent or trivalent (polyvalent) metal salt other than magnesium, and the concentration of the intermediate starting composite salt in the dispersion. However, since most of the divalent or trivalent (polyvalent) metal ions other than magnesium migrate into the desired composite salt, the concentration of this metal salt is preferably 0.02 to 0.6 mols per mol of phosphoric acid in the intermediate starting composite salt.

In the present invention, a method of forming a composition comprising a polyvalent-metal-treated composite salt and a polyvalent-metal-sensitive water-soluble high-molecular weight substance is not particularly limited. Preferable are: (i) a method in which the composite salt is previously prepared, and is then mixed with an aqueous solution of an alkali-metal salt and/or an ammonium salt of a polyvalent-metal-sensitive water-soluble high-molecular weight substance, and the mixture is dried; and (ii) a method in which an intermediate starting composite salt is mixed with an aqueous solution of an alkali-metal salt and/or an ammonium salt of a polyvalent-metal-sensitive water-soluble high-molecular weight substance, and the mixture is then brought into contact with a salt solution of a divalent or trivalent (polyvalent) metal other than magnesium, separated and dried.

In the present invention, the gastric antacid is not particularly limited so long as it controls the change in the pH of the content of the rumen (hereinafter referred to as "rumen solution") and maintains the pH at from 6.2 to 7.0. Carbonates, hydrogencarbonates, hydroxides and oxides of alkali metals and alkaline-earth metals are preferable because they are non-toxic. Most preferable are sodium carbonate, sodium hydrogencarbonate, magnesium hydroxide, magnesium oxide, potassium hydroxide, calcium carbonate and magnesium carbonate which are all appropriately basic. These can be used either singly or in combination.

The administration of the ruminant feed additive composition containing the phosphoric acid-amino acid composite salt in the presence of the gastric antacid is effective for controlling the change in the pH of the rumen solution and exhibiting in the rumen solution the properties of the phosphoric acid-amino acid composite salt which is insoluble in neutral or alkaline aqueous solution and soluble in acidic aqueous solution. That is, it has been observed that the pH of the rumen solution is sometimes decreased to less than 6.2 depending on the feed composition, the physical condition of the ruminant or the change in the pH over the course of time by the fermentation of materials in the rumen. The composition of the phosphoric acid-amino acid composite salt is gradually dissolved in the rumen solution having a low pH, eluting the basic amino acid as an active ingredient. Accordingly, maintaining the pH at 6.2 or more results in an increase in the usefulness of the composition of the phosphoric acid-amino acid composite salt of the present invention.

In general, the normal pH of the rumen solution of ruminants, including a milk cow, is 6.2 to 7.0, and a notable decrease in the pH leads to abnormal fermentation of the rumen. For example, acetic acid-producing microorganisms grow more than propionic acid-producing microorganisms, decreasing production of milk fat, which largely depends on propionic acid formed in the rumen. Further, when low pH levels continue, the physical condition of the milk cow deteriorates, owing to the abnormal growth of lactic acid-producing microorganisms, and the milk cow sometimes dies.

In the present invention, a process of forming the ruminant feed additive composition containing the phosphoric acid-amino acid composite salt and/or the phosphoric acid-amino acid composite salt composition and the gastric antacid as active ingredients is not particularly limited. Preferable examples include a method in which powders are mixed to form a mixed powder, a method in which the phosphoric acid-amino acid composite salt and/or the phosphoric acid-amino acid composite salt composition and the gastric antacid are mixed, and the mixture is granulated, and a method in which the gastric antacid is dissolved or dispersed into water, and the phosphoric acid-amino acid composite salt and/or the phosphoric acid-amino acid composite salt composition is dipped in, or coated with, the solution or the dispersion.

In the present invention, the mixing ratio of the phosphoric-acid amino acid composite salt composition and the gastric antacid constituting the ruminant feed additive composition varies depending on the type and composition of the gastric antacid, the feeding conditions of the ruminant to which this composition is administered, and the composition of the feed. The amount of the gastric antacid is preferably 5 to 1,000 parts by weight per 100 parts by weight of the phosphoric acid-amino acid composite salt composition.

In another method in which the phosphoric acid-amino acid composite salt and/or the phosphoric acid-amino acid composite salt composition and the gastric antacid are used together when this salt and/or composition is orally administered to a ruminant, the gastric antacid is administered to the ruminant before, or simultaneously with, the administration of this composite salt and/or composition containing the gastric antacid alone or in combination with the other feed composition. A method of administering the gastric antacid is not particularly limited. Preferable examples include a method in which a particulate gastric antacid is mixed with the other feed composition, and the mixture is administered; a method in which a composition obtained by previously mixing and pulverizing a gastric antacid with part of another feed composition and the mixture is administered; and a method in which a powder or an aqueous solution and/or an aqueous dispersion of a gastric antacid is sprayed on another feed composition, and the mixture is administered. When employing a complete compound fertilizer administration method (a method in which a crude feed such as silage or hay, a high-nutrient compound fertilizer and the other feed additive composition are completely mixed in advance and the mixture is administered to a milk cow or the like) which has been widely used in the dairy industry in recent years; a method in which a powdery or particulate gastric antacid is mixed with another feed composition and the mixture is administered to an animal; and a method in which a composition obtained by mixing a gastric antacid with part of another feed composition in advance and the mixture is administered to an animal, are preferably used.

With regard to the feed additive composition containing the phosphoric acid-amino acid composite salt and/or the phosphoric acid-amino acid composite salt composition as a main component of the present invention, the composite salt composition may be dried and pulverized, and the powder used as is, regardless of the use of a gastric antacid. Alternatively, the composition may be used as a ruminant feed additive composition in the form of granules which have not been pulverized, or in the form of granules having an appropriate diameter.

In the present invention, the granules of the phosphoric acid-amino acid composite salt are uniform granules without structure, in contrast to a structure coated with the other coating component. With respect to the uniform granules of the present invention, the composition of granular material having a diameter of from approximately 1 to 2 mm, obtained from the uniform granules, is not changed. That is, the limit of the diameter in which granules are destroyed through chewing is between approximately 1 and 2 mm. Therefore, when the composition of the granular materials having a diameter of from approximately 1 to 2 mm is uniform, the composition of the granules after chewing is constant. Thus, when the granules are mixed or pulverized with the other feed components, elution of the basic amino-acid component is not greatly effected.

The granulation can be conducted by usual methods so long as the above-mentioned uniformity is provided. Preferable are: (i) a method in which the composite salt is mixed with an appropriate binder, and the mixture is granulated through extrusion-granulation, rolling-granulation, compression-granulation, melt-spray-granulation or the like; (ii) a method in which a slurry is spray-dried; and (iii) a method in which a powder is granulated together with an appropriate binder through granulation using a fluidized bed or through stirring-granulation.

The binder is not particularly limited, and an ordinary binder can be used. The binder includes water-soluble binders and hydrophobic binders. Specific examples of the water-soluble binders include water-soluble polysaccharides such as a starch, a carboxymethyl cellulose salt, an alginate, hydroxypropyl cellulose and a starch glycolic acid salt; water-soluble proteins such as casein sodium, gelatin and soybean protein; saccharides such as molasses, lactose and dextrin; and synthetic high-molecular weight substances such as a polymethacrylate salt, polyvinyl alcohol and polyvinyl pyrrolidone. Specific examples of the hydrophobic binders include natural waxes such as a shellac resin, a rosin, bees wax and paraffin wax; higher aliphatic acids such as cetanol and stearic acid; materials associated with fats and oils, such as higher fatty acid metal salts, animal and vegetable fats and oils, and hardened animal and vegetable fats and oils; nonionic surfactants such as glycerin monostearate; and semi-synthetic resins and synthetic high-molecular weight substances such as acetyl cellulose, polyvinyl acetate, ester gum and a coumarone resin.

The ratio of the binder to the phosphoric acid-amino acid composite salt which undergoes granulation varies depending on the type of the binder. It is preferably 0.1 to 50% by weight per 100 parts by weight of the phosphoric acid-amino acid composite salt. Further, the diameter of the granules is not particularly limited. Granules having an average diameter of approximately 5 mm or less are preferred because the irregularity of the feed is decreased. Granules having an average diameter of from 2 to 0.2 mm are especially preferred because they facilitate mixing with other feed components.

The granules containing the phosphoric acid-amino acid composite salt of the present invention can be prepared by adding, besides the amino-acid composite salt and the binder, other additives in order to adjust the specific gravity, to increase the strength of granules, to increase the melt-destruction in the abomasum, to improve processability in preparation of the granules, and so forth. The additives are selected from powders and waxes to form uniform granules. Specific examples include inorganic substances such as carbonates, phosphates and hydroxides of alkaline-earth metals, talc, bentonite, clay and fine silica; and organic substances such as paraffin wax, polyethylene powder, pulp powder, cellulose powder and xanthone.

In addition, the granules containing the phosphoric acid-amino acid composite salt of the present invention can be prepared by uniformly dispersing another biologically active substance, unless it would impair the protection of the phosphoric acid-amino acid composite salt in the rumen and elution in the abomasum. Other biologically active substances include known nutrients and chemicals such as amino acids, derivatives thereof, hydroxy compounds of amino acids, vitamins and veterinary agents. These may be used either singly or in combination. Specific examples include amino acids such as methionine, tryptophan and threonine; amino-acid derivatives such as calcium salts of N-acylamino acid and N-hydroxymethyl methionine; amino-acid hydroxy compounds such as 2-hydroxy-4-methylmercaptobutyric acid and its salt; calory sources such as starch, fatty acid and fatty acid metal salt; vitamins such as vitamin A, vitamin A acetate, vitamin A palmitate, a B vitamin, thiamine, thiamine hydrochloride, riboflavin, nicotinic acid, nicotinic acid amide, calcium panthotenate, choline panthotenate, pyridoxine chloride, choline chloride, cyanocobalamin, biotin, folic acid, p-aminobenzoic acid, vitamin $D_2$ vitamin $D_3$ and vitamin E, as well as substances having similar properties; tetracycline-type, amino-macrolide-type, macrolide-type and polyether-type antibiotics; insect repellents such as negphon; vermifuges such as piperazine; and hormones such as estrogen, stilbestrol, hexestrol, thyroprotein, goitrogen and growth hormone.

The present invention is illustrated more specifically by referring to the following Examples and Comparative Examples. However, the present invention is not limited thereto.

With respect to a biologically active substance, the amount of an amino acid and the amount of an amino acid eluted in the Examples were measured by liquid chromatography.

EXAMPLES

Elution into a Rumen Solution

A milk cow fitted with a rumen fistula was fed with a typical feed composition. The contents of the rumen were collected from the rumen fistula within 1 hour after the administration of the feed. The crude solid material was removed using a gauge to form a rumen solution. Acetic acid was added to adjust the pH to 5.8. Then, the above-mentioned gastric antacid or acetic acid was added to adjust the pH to the desired value. Two-hundred milliliters of the rumen solution were charged into a 300-milliliter Erlenmeyer flask together with 0.2 g of a sample (The amount of the basic amino acid contained in the sample will be referred to as "M") and the mixture was shaken at 39° C. for 24 hours. After shaking, the amount (Q) of the basic amino acid eluted in the supernatant of the rumen solution, and the amount (P) of the basic amino acid present after adding 0.6 ml of conc. hydrochloric acid to the rumen solution after shaking to completely dissolve the remaining sample, were analyzed respectively, and the rate (S) of elution of the basic amino acid into the rumen solution was calculated using the following equation.

$$S(\%)=[P(mg)-Q(mg)]\times 100/M \ (mg)$$

Elution into a Corresponding Abomasum Solution

A sample (approximately 0.5 g) was charged into a 300-milliliter Erlonmeyer flask, and 200 ml of an acetate-phosphate buffer solution corresponding to an abomasum solution were poured therein. The solution was shaken at 39° C. for 1 hour. After the completion of the shaking, the amount of the basic amino acid eluted was analyzed, and the rate of elution of the basic amino acid into the abomasum solution was calculated

* Acetate-phosphate buffer solution:

The buffer was prepared by dissolving the following reagents into 1,000 ml of water and adjusting the pH of the solution to 2.2 with hydrochloric acid:

sodium dihydrogenphosphate 2-hydrate 1.95 g sodium acetate 3-hydrate 3.40 g

Example 1

Magnesium secondary phosphate 3-hydrate (174.3 g) was added to 1,300 g of an L-lysine basic aqueous solution (concentration: 45% by weight), and the mixture was heat-stirred at 80° C. for 3 hours. Then, particulate crystals of magnesium secondary phosphate 3-hydrate dissolved, and fine crystals were formed in large amounts. The thus-formed crystals were filtered, washed with 1,000 ml of water, and then dried at 60° C. under reduced pressure to obtain 285 g of a white crystalline powder. One gram of this white powder was added to 100 ml of pure water, and the mixture was stirred. No dissolution was observed. This product was designated an intermediate starting composite salt-1. This intermediate starting composite salt-1 (250 g) and 40 g of calcium chloride 2-hydrate were mixed with 2,000 ml of water, and the mixture was stirred at room temperature for 2 hours. After the solid material was separated from the reaction mixture through filtration, 300 ml of water and 3.0 g of carboxymethyl cellulose sodium salt were added. These were mixed well, and the mixture was then dried to give 255 g of the desired composition-1 containing the polyvalent-metal-treated composite salt and carboxymethyl cellulose calcium salt.

Example 2

An L-lysine basic aqueous solution (4,386 g, concentration: 20% by weight) was mixed and neutralized with 231 g of phosphoric acid (concentration: 85%). To this mixed solution was added a solution of 493 g of magnesium sulfate 7-hydrate in 1,000 ml of water all at once. The gel-like precipitate formed was filtered, washed with 12,000 ml of water, and then dried at 60° C. under reduced pressure to give 280 g of a white powder. One gram of this white powder was added to 100 ml of pure water, and the mixture was stirred. No dissolution was observed. This product was designated an intermediate starting composite salt-2. This intermediate starting composite salt-2 (250 g) and 40 g of calcium chloride 2-hydrate were mixed with 2,000 ml of water, and the solution was stirred at room temperature for 2 hours. The solid material was separated from the mixed solution through filtration, and was then dried to obtain 241 g of the desired polyvalent-metal-treated composite salt-2.

Example 3

An L-lysine basic aqueous solution (650 g, concentration: 45% by weight) was mixed and neutralized with 461.2 g of phosphoric acid (concentration: 85%). The resulting solution was mixed with a dispersion obtained by fully dispersing 291.7 g of magnesium hydroxide in 1,000 ml of water. Then, the mixture was allowed to react and generate heat, to form a white solid. After this white solid was heated at 95° C. for 3 hours, 3,000 ml of pure water were added, and the mixture was pulverized. The solid material was filtered, washed with 3,000 ml of water, and dried at 60° C. under reduced pressure to obtain 750 g of a white powder. One gram of this white powder was added to 100 ml of pure water, and the mixture was stirred. No dissolution was observed. This product was designated composite salt-3.

Example 4

An L-lysine basic aqueous solution (311 g, concentration: 47% by weight) was mixed and neutralized with 461.2 g of phosphoric acid (concentration: 85%). The resulting solution was mixed with a dispersion obtained by fully dispersing 291.7 g of magnesium hydroxide in 700 ml of water. Then, the mixture was allowed to react and generate heat, to form a white solid. This white solid was heated at 90° C. for 3 hours, then pulverized, and dried at 60° C. under reduced pressure to obtain 750 g of a white powder. One gram of this white powder was added to 100 ml of pure water, and the mixture was stirred. No dissolution was observed. This product was designated intermediate starting composite salt-4. This intermediate starting composite salt-4 (250 g) and 3.0 g of sodium alginate were mixed with 350 ml of water, and the mixture was extruded into a solution of 20 g of calcium chloride in 1,000 ml of water using a syringe. The mixture which solidified in string form was further dipped therein at room temperature for 2 hours, washed with water, and dried to give 247 g of composition-4 comprising the polyvalent-metal-treated composite salt and calcium alginate.

Example 5

An L-lysine basic aqueous solution (4,386 g, concentration: 20% by weight) was mixed and neutralized with 231 g of phosphoric acid (concentration: 85%), and 20 g of the white crystalline powder obtained in Example 1 were added. A solution of 407 g of magnesium chloride 6-hydrate in 500 ml of water was gradually added to the solution in small portions, and fine crystals were formed. The resulting crystals were filtered, washed with 3 liters of water, and dried at 60° C. under reduced pressure to obtain 573 g of a white crystalline powder. One gram of this white powder was added to 100 ml of pure water, and the mixture was stirred. No dissolution was observed. This product was designated intermediate starting composite salt-5. One-hundred grams of this intermediate starting composite salt-5 and 20 g of zinc chloride were mixed with 1,000 ml of water, and the mixture was stirred at room temperature for 3 hours. The solid material was separated from this mixture through filtration, and was then dried to give 103 g of a polyvalent-metal-treated composite salt-5.

Example 6

Magnesium secondary phosphate 3-hydrate (87.2 g) was added to 730 g of an L-lysine basic aqueous solution (concentration: 40% by weight), and the mixture was heat-stirred at 80° C. for 3 hours. Consequently, particulate crystals of magnesium secondary phosphate 3-hydrate dissolved, and fine crystals were formed. After 46.1 g of phosphoric acid (concentration: 85%) were gradually added to this mixture while being cooled, a solution of 98.6 g of magnesium sulfate 7-hydrate in 150 ml of water was added, all at once. Then, the mixture became a viscous crystalline slurry. The resulting crystals were filtered, washed with 1,300 ml of water, and then dried at 60° C. under reduced pressure to obtain 198 g of a white crystalline powder. One gram of this white powder was added to 100 ml of pure water, and the mixture was stirred. No dissolution was observed. This product was designated intermediate starting composite salt-6. One-hundred grams of this intermediate starting composite salt-6 and 20 g of zinc chloride were mixed with 1,000 ml of water, and the mixture was stirred at room temperature for 3 hours. After the solid material was separated from the mixture through filtration, 200 ml of water and 3.0 g of pectin were added. These were mixed well, and the mixture was dried to give 100 g of the desired composition-6 comprising the polyvalent-metal-treated composite salt and pectin zinc salt.

Example 7

An L-lysine basic aqueous solution (4,873 g, concentration: 30% by weight) was mixed and neutralized with 461 g of phosphoric acid (concentration: 85%). To this mixture was added a solution of 610 g of magnesium chloride 6-hydrate in 1 liter of water, all at once. The viscous mixture formed was uniformly mixed with a dispersion obtained by dispersing 93.3 g of magnesium hydroxide in 700 ml of water, and the resulting mixed solution was allowed to stand overnight to form a white precipitate. The precipitate was filtered, washed with 7,000 ml of water, and then dried at 60° C. under reduced pressure to obtain 980 g of a white powder. One gram of this white powder was added to 100 ml of pure water, and the mixture was stirred. No dissolution was observed. This product was designated intermediate starting composite salt-7.

One-hundred grams of this intermediate starting composite salt-7 and 30 g of aluminum ammonium sulfate (burnt alum) were mixed with 1,000 ml of water, and the mixture was stirred at room temperature for 2 hours. After the solid material was separated from the mixed solution through filtration, 200 ml of water and 2.0 g of sodium polyacrylate were added. These were mixed well, and the mixture was dried to obtain 103 g of the desired composition-7 comprising the polyvalent-metal-treated composite salt and aluminum polyacrylate.

Example 8

A milk cow fitted with a rumen fistula was fed with a typical feed composition. The contents of the rumen were collected from the rumen fistula within 1 hour after the administration of the feed. The crude solid material was removed using a gauge to form a rumen solution. Acetic acid was added thereto to adjust the pH to 5.8. Then, sodium carbonate used as a gastric antacid was added, thereto to adjust the pH to 6.8 to 6.2. Acetic acid was added to adjust the pH to 5.5. With respect to composition-1 comprising the polyvalent-metal-treated composite salt and carboxymethyl cellulose calcium salt; the polyvalent-metal-treated composite salt-2 and the composite salt-3 obtained in Examples 1 to 3, elution into the rumen solution having a pH of from 5.5 to 6.8 and elution into the corresponding abomasum solution were measured. The results are shown in Table 1.

respect to the composite salt-3, composition-4 comprising the polyvalent-metal-treated composite salt and calcium alginate, the zinc-treated composite salt-5, composition-6 comprising the polyvalent-metal-treated composite salt and pectin zinc salt and composition-7 comprising the polyvalent-metal-treated composite salt and aluminum polyacrylate obtained in Examples 3 to 7, elution into the rumen solution having a pH of 6.2 to 6.8 and elution into the corresponding abomasum solution, were measured. The results are shown in Table 2.

Comparative Example 1

With respect to the composite salt-3, composition-4 comprising the polyvalent-metal-treated composite salt and calcium alginate, the zinc-treated composite salt-5, composition-6 comprising the polyvalent-metal-treated composite salt and pectin zinc salt and composition-7 comprising the polyvalent-metal-treated composite salt and aluminum polyacrylate, elution into the rumen solution having a pH of 5.8 was measured in the same manner as in Example 9. The results are shown in Table 2.

TABLE 1

Analysis of amino acid composite salt, composition and elution properties

|  |  | Composition-1 | Treated composite salt-2 | Composite salt-3 |
|---|---|---|---|---|
| Method |  | Example 1 | Example 2 | Example 3 |
| Starting materials |  | L-lysine base magnesium secondary phosphate carboxymethyl-cellulose sodium salt calcium chloride | L-lysine base phosphoric acid magnesium sulfate calcium chloride | L-lysine base phosphoric acid magnesium hydroxide |
| Main composition | Lysine content | 46.0% | 18.2% | 18.5% |
|  | Mg content | 7.4% | 14.8% | 16.6% |
|  | Other metal | Ca | Ca | — |
|  | Its content | 2.6% | 2.0% |  |
|  | Phosphorus content ($PO_4$) | 10.8% (33.1%) | 14.9% (45.7%) | 15.8 (48.5%) |
| Elution into rumen solution | pH 6.8 | 67% | 10% | 44% |
|  | pH 6.5 | 70% | 12% | 47% |
|  | pH 6.2 | 75% | 15% | 51% |
|  | pH 5.8 | 85% | 25% | 65% |
|  | pH 5.5 | 92% | 38% | 79% |
| Elution into corresponding abomasum solution |  | 100% | 100% | 100% |

Example 9

In the same manner as in Example 8, acetic acid was added to the rumen solution to adjust the pH to 5.8. Then, from 1.2 to 2.5 g, per 200 ml of rumen solution, of sodium hydrogencarbonate used as a gastric antacid were added to the rumen solution to adjust the pH to 6.2 to 6.8. With

TABLE 2

Analysis of amino acid composite salt, composition and elution properties

|  |  | Composite salt-3 | Composition-4 | Treated composite salt-5 | Composition-6 | Composition-7 |
|---|---|---|---|---|---|---|
| Method |  | Example 3 | Example 4 | Example 5 | Example 6 | Example 7 |
| Starting materials |  | L-lysine base phosphoric acid magnesium hydroxide | L-lysine base phosphoric acid magnesium hydroxide sodium alginate calcium chloride | L-lysine base phosphoric acid magnesium chloride zinc chloride | L-lysine base magnesium secondary phosphate phosphoric acid magnesium sulfate pectin zinc chloride | L-lysine base phosphoric acid magnesium hydroxide alum sodium polyacrylate |
| Main composition | lysine | 18.5% | 18.4% | 45.4% | 30.2% | 28.0% |
|  | Mg | 16.0% | 15.7 | 8.0 | 11.6% | 13.2 |
|  | other | — | Ca | Zn | Zn | Al |
|  | metal | — | 4.0% | 2.8% | 2.6% | 0.9% |
|  | phosphorus ($PO_4$) | 15.8 (48.5%) | 16.8% (51.5%) | 10.9% (33.4%) | 12.8% (39.2%) | 14.1% (43.2%) |
| Amount of $NaHCO_3$ |  | 2.50 g | 1.44 g | 1.92 g | 2.50 g | 1.20 g |
| (pH) |  | (6.8) | (6.4) | (6.6) | (6.8) | (6.2) |
| Elution into rumen solution |  | 44% | 48% | 75% | 42% | 18% |
| [Comparative Example 1] |  |  |  |  |  |  |
| (pH) |  | (5.8) | (5.8) | (5.8) | (5.8) | (5.8) |
| Elution into rumen solution |  | 65% | 78% | 95% | 69% | 68% |

Example 10

The calcium-treated composite salt-2, the composite salt-3 and composition-7 comprising the aluminum-treated composite salt and aluminum polyacrylate obtained in Examples 2, 3 and 7, were used as main components in amounts of 10.0 g. Sodium hydrogencarbonate, magnesium oxide and calcium hydroxide were used as gastric antacids in amounts of 10.0 g, 5.0 g and 7.0 g, respectively. Carboxymethyl cellulose sodium salt, potato starch and corn starch were used as binders in amounts of 1.0 go These components were kneaded with 10 ml of water, formed into strings, dried and cut to form uniform granules having an average diameter of 3 mm. In this manner, composition granule-2 comprising the calcium-treated composite salt-2 and the gastric antacid, composition granule-3 comprising the composite salt-3 and the gastric antacid and composition granule-7 comprising the aluminum-treated composite salt and aluminum polyacrylate were obtained. Two-hundred milligrams of each of the composition granules-2, -3 and -7 were charged into 200 ml of a rumen solution which had been collected and adjusted to a pH of 5.8 as in Example 9. Then, elution into the rumen solution was measured. The results are shown in Table 3.

TABLE 3

Formulation of amino-acid composite salt composition and elution properties

| Main component of granules | Main component |  | Treated composite salt-2 Ca-treated composite salt-2 | Composition Granule-3 Composite salt-3 | Composition Granule-7 Composition-7 |
|---|---|---|---|---|---|
|  | Method |  | Example 2 | Example 3 | Example 7 |
|  | Starting materials of composite and composition |  | L-lysine base phosphoric acid magnesium sulfate calcium chloride | L-lysine base phosphoric acid magnesium hydroxide | L-lysine base phosphoric acid magnesium hydroxide burnt alum sodium polyacrylate |
|  | Main formulation | lysine | 18.2% | 18.5% | 28.0% |
|  |  | Mg | 14.8% | 16.6% | 13.2% |
|  |  | other metal | Ca: 2.0% |  | Al: 0.9% |
|  |  | phosphorus ($PO_4$) | 14.9% (45.7%) | 15.8% (48.5%) | 14.1% (43.2%) |
| Granule starting materials | gastric antacid (amount) |  | sodium hydrogen-carbonate (10.0 g) | magnesium oxide (5.0 g) | calcium hydroxide (7.0 g) |
|  | Binder |  | carboxy-methyl | potato starch | corn starch |

TABLE 3-continued

| | | Formulation of amino-acid composite salt composition and elution properties | | |
|---|---|---|---|---|
| | (amount) | cellulose sodium salt (1.0 g) | (1.0 g) | (1.0 g) |
| Elution test | Elution into rumen solution | 2% | 27% | 7% |
| | pH after test | 6.8 | 6.6 | 6.2 |
| Comparative Example 2 Starting materials of granule | Main component | Intermediate starting composite salt-2 | Intermediate starting composite salt-3 | Composition-7 |
| | Binder (amount) | carboxymethyl-cellulose sodium salt (1.0 g) | potato starch (1.0 g) | corn starch (1.0 g) |
| Elution test | Elution into rumen solution | 18% | 48% | 25% |
| | pH after test | 5.9 | 6.0 | 5.9 |

Comparative Example 2

Ten grams of each of the calcium-treated composite salt-2, the composite salt-3 and composition-7 comprising the aluminum-treated composite salt and aluminum polyacrylate were added to 10 ml of water together with 1.0 g of carboxymethyl cellulose sodium salt, potato starch or corn starch to form a string-like product. This product was dried, and then cut to form uniform granules having an average diameter of 3 mm. Thus, composition granule-2 containing the calcium-treated composite salt-2, composition granule-3 containing the composite salt-3, and composition granule-7 containing the composition of the aluminum-treated composite salt and aluminum polyacrylate and the gastric antacid were obtained. Two-hundred milligrams of each of the resulting composition granules-2, -3 and -7 were charged into 200 ml of a rumen solution which had been collected and adjusted to a pH of 5.8 as in Example 9. Thus, elution into the rumen solution was measured. The results are shown in Table 3.

Example 11

An L-lysine basic aqueous solution (609 g, concentration: 30% by weight) was mixed and neutralized with 337.9 g of polyphosphoric acid ($H_6P_4O_{13}$) while being cooled. To this solution was added a dispersion of 259.3 g of calcium hydroxide in 500 ml of water. The mixture generated heat, and the overall mixture gradually solidified. The thus-obtained solid material was pulverized, washed with 12,000 ml of water, and then dried at 60° C. under reduced pressure to obtain 505.9 g of a white powder. One gram of this white powder was added to 100 ml of pure water and the corresponding abomasum solution, and the mixture was stirred. No dissolution was observed. One gram of this white powder was dissolved in 100 ml of dilute hydrochloric acid, and the concentration of L-lysine was measured. The concentration was found to be 165 mg/dl, and the content of L-lysine was 16.5%. Further, 1.00 g of this white powder was mixed with 100 ml of pure water, and the mixture was sonicated for 5 minutes. Then, the concentration of L-lysine in the supernatant was measured, and found to be 18 mg/dl, and the rate of elution into pure water was 11%. Elution of this white powder into the corresponding abomasum solution was evaluated. The rate of elution into the corresponding abomasum solution was 100%. This white powder (0.2 g) and 0.1 g of calcium hydroxide used as a gastric antacid were charged into 200 ml of a rumen solution which had been collected and adjusted to a pH of 5.8 as in Example 9. Thus, the elution into the rumen solution was measured. The rate of elution into the rumen solution was 12%.

Example 12

An L-lysine basic aqueous solution (487 g, concentration: 30% by weight) was mixed with 51.9 g of calcium hydroxide and 216 g of calcium dihydrogen pyrophosphate ($CaH_2P_2O_7$), and the mixture was heated at 90° C. while being stirred. Then, the overall mixture was gradually solidified. The resulting solid material was pulverized, washed with 10,000 ml of water, and then dried at 60° C. under reduced pressure to obtain 356 g of a white powder. One gram of this white powder was added to 100 ml of pure water and the corresponding abomasum solution, and the mixture was stirred. No dissolution was observed. One gram of this white powder was dissolved in 100 ml of dilute hydrochloric acid, and the concentration of L-lysine was measured. The concentration was found to be 116 mg/dl, and the content of L-lysine was 11.6%. Further, 1.00 g of this white powder was mixed with 100 ml of pure water; and the mixture was sonicated for 5 minutes. The concentration of L-lysine in the supernatant was measured, and found to be 27 mg/dl, and the rate of elution into pure water was 23%. The elution of this white powder into the corresponding abomasum solution was 100%. This white powder (0.2 g) and 0.1 g of sodium hydrogencarbonate used as a gastric antacid were charged into 200 ml of a rumen solution which had been collected and adjusted to a pH of 5.8 as in Example 9, and elution into the rumen solution was measured. As a result, the rate of elution into the rumen solution was 25%.

Example 13

An L-lysine basic aqueous solution (363 g, concentration: 50% by weight) was mixed and neutralized with 467 g of metaphosphoric acid [$(HPO_3)_n$] while being cooled. To this solution was added a dispersion of 166.7 g of calcium hydroxide in 300 ml of water. The mixture generated heat, and the overall mixture gradually solidified. The thus-obtained solid material was pulverized, washed with 12,000 ml of water, and then dried at 60° C. under reduced pressure to obtain 295 g of a white powder. One gram of this white powder was added to 100 ml of pure water and the corresponding abomasum solution, and the mixture was stirred.

No dissolution was observed. One gram of this white powder was dissolved in 100 ml of dilute hydrochloric acid, and the concentration of L-lysine was measured. The concentration was found to be 99 mg/dl, and the content of L-lysine was 9.9%. Further, 1.00 g of this white powder was mixed with 100 ml of pure waters and the mixture was sonicated for 5 minutes. Then, the concentration of L-lysine in the supernatant was measured, and found to be 2.4 mg/dl , and the rate of elution into pure water was 2.4%. Elution of this white powder into the corresponding abomasum solution was evaluated. The rate of elution into the corresponding abomasum solution was 100%. This white powder (0.2 g) and 0.1 g of magnesium oxide used as a gastric antacid were charged into 200 ml of a rumen solution which had been collected and adjusted to a pH of 5.8 as in Example 9. Thus, the elution into the rumen solution was measured. The rate of elution into the rumen solution was 15%.

Comparative Example 3

The white powder (0.2 g) obtained in each of Examples 11 to 13 was charged into 200 mg of a rumen solution which had been adjusted to a pH of 5.8 as in Example 9, and elution into the rumen solution was measured. As a result, the rates of elution into the rumen solution were 25%, 37% and 29% respectively.

Example 14

L-alginic acid (174.2 g) and 98.0 g of phosphoric acid (concentration: 85%) were dissolved into 300 ml of water, and this solution was mixed with a dispersion obtained by dispersing 72.9 g of magnesium hydroxide into 200 ml of water. Then, the mixture was allowed to react and generated heat, to form a white solid. After this white solid was heated at 95° C. for 3 hours, 1,000 ml of pure water were added thereto, and the mixture was pulverized, and mixed with 10 g of calcium hydroxide. The mixture was stirred for 2 hours. The solid material was filtered, and washed with 1,000 ml of water. Subsequently, 500 ml of water and 3.0 g of sodium alginate were added. These were mixed well, and dried to obtain 245 g of the desired powder composition comprising the composite salt and calcium alginate. One gram of this powder was added to 100 ml of pure water, and the mixture was stirred. No dissolution was observed. One gram of this powder was dissolved in 100 ml of dilute hydrochloric acid, and the concentration of arginine was measured. The concentration, was found to be 350 mg/dl, and the content of arginine was 35.0%. Further, 1.00 g of this white powder was mixed with 100 ml of pure water, and the mixture was sonicated for 5 minutes to measure the concentration of arginine in the supernatant. As a result, it was found to be 50 mg/dl, and the rate of elution into pure water was 14.3%. This white powder (0.2 g) and 0.1 g of sodium hydrogencarbonate used as a gastric antacid were charged into 200 ml of a rumen solution which had been collected and adjusted to a pH of 5.8 as in Example 9, and elution into the rumen solution was measured. As a result, the rate of elution of arginine into the rumen solution was 16%.

Example 15

The intermediate starting composite salt-2 obtained in Example 2 was mixed with 50 g of bentonite, 30 g of casein sodium and 5 g of starch sodium glycolate, and 25 g of magnesium hydroxide used as a gastric antacid and 100 ml of water were added. The mixture was kneaded, extruded using a disc pelletizer having a bore diameter of 2 mm, and cut to a length of approximately 2 mm. The product was dried, and formed into granules having a diameter of approximately 2 mm. The thus-obtained granules were cut into smaller granules having a diameter of approximately 0.5 mm. The five granules thereof were heat-extracted with dilute hydrochloric acid, and the amino-acid content was measured. As a result, no difference in the amino-acid content was observed among these smaller granules. The thus-formed granules (0.2 g) were charged into 200 ml of a rumen solution which had been and adjusted to a pH of 5.8 as in Example 9. Thus, elution into the rumen solution was measured. As a result, the rate of elution into the rumen solution was 5%. The rate of elution of the granules into the corresponding abomasum solution was 97%. With respect to the smaller granules having a diameter of approximately 0.5 mm, the elution into the rumen solution and the elution into the corresponding abomasum solution were evaluated. The rate of elution into the rumen solution was 6%, and the rate of elution into the corresponding abomasum solution was 98%.

Example 16

Two-hundred grams of composition-4 comprising the polyvalent-metal-treated composite salt and calcium alginate as obtained in Example 4 were mixed with 15 g of methionine powder, 40 g of calcium carbonate, 20 g of casein sodium and 4 g of carboxymethyl cellulose sodium salt; and 40 g of sodium hydrogenphosphate used as a gastric antacid and 70 ml of water were added. The resulting mixture was kneaded, extruded using a disc pelletizer having a bore diameter of 2 mm, and cut to a length of approximately 2 mm. The product was dried, and formed into granules having a diameter of approximately 2 mm. The thus-obtained granules were cut into smaller granules having a diameter of approximately 0.5 mm. The five granules thereof were heat-extracted with dilute hydrochloric acid, and the amino-acid content was measured. As a result, no difference in the amino-acid content was observed among these smaller granules. The thus-formed granules (0.2 g) were charged into a rumen solution which had been collected and adjusted to a pH of 5.8 as in Example 9. Thus, elution into the rumen solution was measured. As a result, the rate of elution of lysine into the rumen solution was 10%. At the same time, elution of methionine into the rumen solution was measured. Consequently, the rate of elution of methionine into the rumen solution was 25%. Further, elution of the granules into the corresponding abomasum solution was evaluated. The rates of elution of lysine and methionine were both 98%. With respect to the smaller granules having a diameter of approximately 0.5 mm, elution into the rumen solution and elution into the corresponding abomasum solution were evaluated. The rate of elution of lysine into the rumen solution was 12%, and the rate of elution of methionine into the rumen solution was 28%. The rates of elution of lysine and methionine into the corresponding abomasum solution were both 99%.

Comparative Example 4

Granules were prepared in the same manner as in Examples 15 and 16 except that no gastric antacid was added. Each (0.2 g) of the main components obtained in Examples 15 and 16 was charged into 200 ml of a rumen solution which had been adjusted to a pH of 5.8 as in Example 9, and elution into the rumen solution was measured. As a result, with respect to the granule composition corresponding to that of Example 15, the rate of elution of lysine into the rumen solution was 25%. With respect to the granule composition corresponding to that of Example 16, the rate of elution of lysine into the rumen solution was 29%, and the rate of elution of methionine into the rumen solution was 39%.

EFFECTS OF THE INVENTION

The present invention provides a ruminant feed additive composition which contains a basic amino acid such as lysine or the like which tend to be lacking in a ruminant feed, is excellent in terms of protection in the rumen and elution in an abomasum, and can be formed using a composite salt containing a basic amino acid, an alkaline-earth metal and phosphoric acid, a composite salt obtained by treating a composite salt containing a basic amino acid, magnesium and phosphoric acid with a divalent or trivalent (polyvalent) metal other than magnesium, and/or a composition containing the polyvalent-metal-treated composite salt and a water-insoluble salt of a polyvalent-metal-sensitive water-soluble high-molecular weight substance, and a gastric antacid by which the pH in the rumen can be adjusted to 6.2 to 7.0. Further, this feed additive composition can effectively be administered to a ruminant by orally administering the gastric antacid before, or simultaneously with, the oral administration of the composite salt and/or the composition of the composite salt as a feed additive composition. The uniform granules of the present invention are less effected by destruction of the granules due to chewing or mixing with other feed components. Thus, the present invention can provide a ruminant feed additive composition which is excellent in terms of protection in the rumen and elution in the abomasum, in comparison with the prior art.

The present invention provides a feed additive composition which enables a biologically active substance to be effectively absorbed into a ruminant.

Obviously, numerous modifications and variations of the present invention are possible in light of the above teachings. It is therefore to be understood that within the scope of the appended claims, the invention may be practiced otherwise than as specifically described herein.

The Japanese priority document of the present application, Japanese Patent Application No. 341,250/95 filed on Dec. 27, 1995, is hereby incorporated by reference.

What is claimed as new and is desired to be secured by Letters Patent of the United States is:

1. A ruminant feed additive, comprising:
   a gastric antacid in an amount effective for controlling the pH of the rumen, and
   a phosphoric acid-amino acid-polyvalent metal composite salt,
   wherein said phosphoric acid-amino acid-polyvalent metal composite salt comprises at least one alkaline-earth metal selected from the group consisting of Mg, Ca, Sr and Ba, a phosphate moiety of a phosphoric acid selected from the group consisting of orthophosphoric acid, polyphosphoric acids and metaphosphoric acids, and at least one amino acid selected from the group consisting of natural basic amino acids, basic derivatives of natural basic amino acids and basic derivatives of neutral amino acids, and
   said phosphoric acid-amino acid-polyvalent metal composite salt is less soluble in neutral or alkaline aqueous solution than in acidic aqueous solution.

2. The ruminant feed additive of claim 1, wherein said phosphoric acid is orthophosphoric acid, and said phosphoric acid-amino acid-polyvalent metal composite salt is represented by Formula (1):

$$R_a M_b H_c PO_4 \cdot nH_2O \qquad (1)$$

wherein
   R represents a basic amino acid hydrogen cation,
   M represents an alkaline-earth metal,
   a is 0.05 to 1,
   b is 1 to 1.47,
   c is 0 to 0.3,
   a+(2×b)+c=3, and
   n is 0 to 10.

3. The ruminant feed additive of claim 1, wherein said phosphoric acid is a polyphosphoric acid, and said phosphoric acid-amino acid-polyvalent metal composite salt is represented by Formula (2):

$$R_a M_b H_c PO_4 (PO_3)_m \cdot nH_2O \qquad (2)$$

wherein
   R represents a basic amino acid hydrogen cation,
   M represents an alkaline-earth metal,
   a is 0.02×(m+3) to 0.3×(m+3),
   b is 0.35×(m+3) to 0.49×(m+3),
   c is 0 to 0.2×(m+3),
   a+(2×b)+c=m+3,
   m is 1 to 20, and
   n is 0 to 10.

4. The ruminant feed additive of claim 1, wherein said phosphoric acid is a metaphosphoric acid, and said phosphoric acid-amino acid-polyvalent metal composite salt is represented by Formula (3):

$$R_a M_b H_c (PO_3)_m \cdot nH_2O \qquad (3)$$

wherein
   R represents a basic amino acid hydrogen cation,
   M represents an alkaline-earth metal,
   a is 0.02×m to 0.3×m,
   b is 0.35×m to 0.49×m,
   c is 0 to 0.2×m,
   a+(2×b)+c=m,
   m is 3 to 50, and
   n is 0 to 20.

5. The ruminant feed additive of claim 1, wherein said alkaline earth metal is at least one member selected from the group consisting of magnesium and calcium.

6. The ruminant feed additive of claim 1, wherein said phosphoric acid-amino acid-polyvalent metal composite salt further comprises at least one amino acid moiety selected from the group consisting of L-lysine and L-arginine.

7. The ruminant feed additive of claim 1, wherein said gastric antacid is at least one member selected from the group consisting of sodium carbonate, sodium hydrogencarbonate, magnesium hydroxide, magnesium oxide, potassium hydroxide, calcium carbonate, calcium hydroxide, and magnesium carbonate.

8. The ruminant feed additive of claim 1, wherein said ruminant feed additive is in the form of a powder or granules.

9. The ruminant feed additive of claim 1, further comprising another biologically active substances other than said phosphoric acid-amino acid-polyvalent metal composite salt and said gastric antacid.

10. A ruminant feed additive, comprising:
    a gastric antacid-in an amount effective for controlling the pH of the rumen, and a phosphoric acid-amino acid-polyvalent metal composite salt represented by Formula (4):

$$R_aMg_bM_cH_dPO_4 \cdot nH_2O \tag{4}$$

wherein

R represents a basic amino acid hydrogen cation,

M represents a polyvalent metal of m-valence other than magnesium, m is 2 or 3, a is 0.05 to 1.0, b is 0.85 to 1.43, c is 0.02 to 0.6, d is 0 to 0.3, a+(b×2)+(c×m)+d=3, and n is 0 to 20.

11. The ruminant feed additive of claim 10, further comprising a water-insoluble salt of a polyvalent-metal-sensitive water-soluble high-molecular weight substance.

12. The ruminant feed additive of claim 11, wherein said water-insoluble salt of a polyvalent-metal-sensitive water-soluble high-molecular weight substance is selected from the group consisting of a calcium salt, an aluminum salt, a zinc salt and an iron salt, of alginic acid, carrageenan, dieran gum, pectin, carboxymethyl cellulose, carboxymethyl starch, polyacrylic acid, a polyacrylic acid copolymer, polymethacrylic acid, a polymethacrylic acid copolymer, soybean protein or casein.

13. The ruminant feed additive of claim 10, wherein said polyvalent metal of m-valence other than magnesium is at least one member selected from the group consisting of calcium, aluminum, zinc and iron.

14. The ruminant feed additive of claim 10, wherein said basic amino acid hydrogen cation at least one amino acid moiety selected from the group consisting of L-lysine and L-arginine.

15. The ruminant feed additive of claim 10, wherein said gastric antacid is at least one member selected from the group consisting of sodium carbonate, sodium hydrogencarbonate, magnesium hydroxide, magnesium oxide, potassium hydroxide, calcium carbonate, calcium hydroxide, and magnesium carbonate.

16. The ruminant feed additive of claim 10, wherein said ruminant feed additive is in the form of a powder or granules.

17. A method of feeding a ruminant, comprising orally administering a phosphoric acid-amino acid-polyvalent metal composite salt and a gastric antacid to a ruminant;

wherein said phosphoric acid-amino acid-polyvalent metal composite salt comprises at least one alkaline-earth metal selected from the group consisting of Mg, Ca, Sr and Ba, a phosphate moiety of a phosphoric acid selected from the group consisting of orthophosphoric acid, polyphosphoric acids and metaphosphoric acids, and at least one amino acid selected from the group consisting of natural basic amino acids, basic derivatives of natural basic amino acids and basic derivatives of neutral amino acids, said phosphoric acid-amino acid-polyvalent metal composite salt is less soluble in neutral or alkaline aqueous solution than in acidic aqueous solution, and said gastric antacid is administered prior to, or simultaneously with, said phosphoric acid-amino acid-polyvalent metal composite salt in an amount effective for controlling the pH of the rumen.

18. The method of claim 17, wherein said gastric antacid is at least one member selected from the group consisting of sodium carbonate, sodium hydrogencarbonate, magnesium hydroxide, magnesium oxide, potassium hydroxide, calcium carbonate, calcium hydroxide, and magnesium carbonate.

19. A method of feeding a ruminant, comprising orally administering to a ruminant:

(i) a ruminant feed additive comprising a phosphoric acid-amino acid-polyvalent metal composite salt, and (ii) a gastric antacid;

wherein said phosphoric acid-amino acid-polyvalent metal composite salt is represented by Formula (4):

$$R_aMg_bM_cH_dPO_4 \cdot nH_2O \tag{4}$$

wherein

R represents a basic amino acid hydrogen cation,

M represents a polyvalent metal of m-valence other than magnesium, m is 2 or 3, a is 0.05 to 1.0, b is 0.85 to 1.43, c is 0.02 to 0.6, d is 0 to 0.3, a+(b×2)+(c×m)+d=3, and n is 0 to 20, and said gastric antacid is administered prior to, or simultaneously with, said phosphoric acid-amino acid-polyvalent metal composite salt in an amount effective for controlling the pH of the rumen.

20. The method of claim 19, wherein said ruminant feed additive further comprises a water-insoluble salt of a polyvalent-metal-sensitive water-soluble high-molecular weight substance.

21. The method of claim 19, wherein said gastric antacid is at least one member selected from the group consisting of sodium carbonate, sodium hydrogencarbonate, magnesium hydroxide, magnesium oxide, potassium hydroxide, calcium carbonate, calcium hydroxide, and magnesium carbonate.

* * * * *